United States Patent
Lewis et al.

(10) Patent No.: US 8,180,501 B2
(45) Date of Patent: May 15, 2012

(54) CONTROLLING THE TEMPERATURE OF A COMPUTER SYSTEM

(75) Inventors: Andrew J. Lewis, Litchfield, NH (US);
David B. Elting, San Diego, CA (US);
Kenny C. Gross, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 350 days.

(21) Appl. No.: 12/204,433

(22) Filed: Sep. 4, 2008

(65) Prior Publication Data

US 2010/0057271 A1    Mar. 4, 2010

(51) Int. Cl.
*G05D 23/00* (2006.01)
(52) U.S. Cl. .................. 700/300; 700/299; 454/184
(58) Field of Classification Search .............. 700/299, 700/300; 454/184
See application file for complete search history.

(56) References Cited

U.S. PATENT DOCUMENTS

| | | | | |
|---|---|---|---|---|
| 2005/0114739 A1* | 5/2005 | Gupta et al. | .................... | 714/39 |
| 2005/0273208 A1* | 12/2005 | Yazawa et al. | ................ | 700/299 |
| 2010/0136895 A1* | 6/2010 | Sgro | .......................... | 454/184 |

* cited by examiner

*Primary Examiner* — Ryan Jarrett
(74) *Attorney, Agent, or Firm* — Park, Vaughan, Fleming & Dowler LLP

(57) ABSTRACT

Some embodiments of the present invention provide a system that controls the temperature of a computer system. First, a performance parameter of the computer system is monitored. Next, a future temperature of the computer system is predicted based on the performance parameter. Then, exhaust air from the computer system is mixed with ambient air from outside the computer system based on the predicted future temperature, and the mixed exhaust air and ambient air are channeled through the computer system to control the temperature of the computer system.

10 Claims, 2 Drawing Sheets

CONTROLLING THE TEMPERATURE OF A COMPUTER SYSTEM

BACKGROUND

1. Field

The present invention generally relates to techniques for controlling the operation of a computer system. More specifically, the present invention relates to a method and an apparatus that controls the temperature of a computer system.

2. Related Art

As semiconductor integration densities within computer systems continue to increase at an exponential rate, thermal dissipation problems are become increasingly problematic. In particular, as the operating temperatures of chip packages become higher, thermal cycling effects can begin to adversely affect the reliability of computer system internals. For example, a number of degradation mechanisms can be accelerated by thermal cycling at high temperatures, including accelerated solder fatigue; interconnect fretting; differential thermal expansion between bonded materials; delamination failures; thermal mismatches between mating surfaces; differentials in the coefficients of thermal expansion between materials used in chip packages; wirebond shear and flexure fatigue; passivation cracking; electromigration failures; electrolytic corrosion; thermomigration failures; crack initiation and propagation; delamination between chip dies and molding compounds, as well as between the molding compound and the leadframe; die de-adhesion fatigue; repeated stress reversals in brackets leading to dislocations, cracks, and eventual mechanical failures; deterioration of connectors through elastomeric stress relaxation in polymers; and others.

One solution to this problem is to dampen the thermal cycling by "chip throttling" and/or "trash burning." For example, chip throttling can involve reducing processor clock frequencies to reduce thermal output when processor workloads are high, and trash burning can involve increasing processor workloads to raise the mean package temperature when workloads are low. Unfortunately, when the workload is high and chip throttling kicks in, system throughput is reduced at the time a customer application needs it the most. Moreover, this can create a "snowball" effect because when application demand is high, throughput slows down, which can cause application demand to pile up and cause throughput to slow down even further. Additionally, trash burning consumes electricity without doing useful computational work, which can unnecessarily generate greenhouse gases at some distant power plant.

Hence, what is needed is a method and system that controls the temperature of a computer system without the above-described problems.

SUMMARY

Some embodiments of the present invention provide a system that controls the temperature of a computer system. First, a performance parameter of the computer system is monitored. Next, a future temperature of the computer system is predicted based on the performance parameter. Then, exhaust air from the computer system is mixed with ambient air from outside the computer system based on the predicted future temperature, and the mixed exhaust air and ambient air are channeled through the computer system to control the temperature of the computer system.

In some embodiments, monitoring the performance parameter includes systematically monitoring and recording a set of performance parameters of the computer system, wherein the recording process keeps track of the temporal relationships between events in different performance parameters.

In some embodiments, predicting the future temperature of the computer system includes using an autoregressive moving average to predict the future temperature of the computer system.

In some embodiments, predicting the future temperature of the computer system includes predicting the future temperature a predetermined amount of time in the future, wherein the predetermined amount of time is determined based on parameters including a thermal inertia of the computer system.

In some embodiments, mixing exhaust air from the computer system with ambient air from outside the computer system includes generating a control signal to control the mixing.

In some embodiments, the control signal includes a valve control signal.

In some embodiments, mixing exhaust air from the computer system with ambient air from outside the computer system based on the predicted future temperature includes mixing exhaust air from the computer system with ambient air from outside the computer system so that the temperature of the computer system stays within a predetermined range of a target temperature.

Some embodiments further include reducing a variation of speed of a fan in the computer system based on the temperature of the computer system.

In some embodiments, controlling the temperature of the computer system includes controlling a temperature variation of the computer system.

In some embodiments, controlling the temperature of the computer system includes controlling the temperature of a processor in the computer system.

In some embodiments, the performance parameter includes at least one of: a temperature of the computer system, a current load of the computer system, and a moving history window of a load on the computer system.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Figure 1:
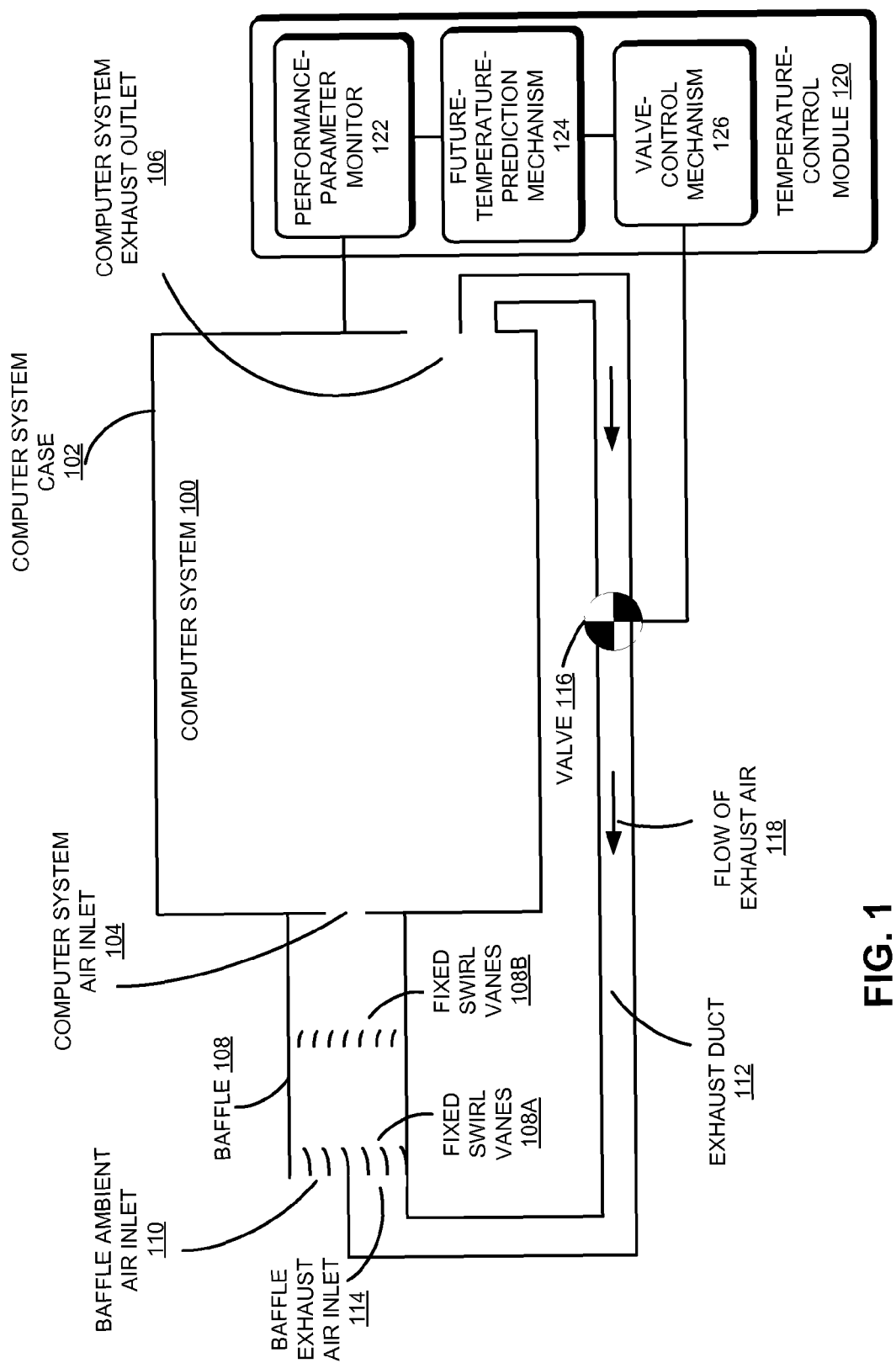
FIG. 1 represents a system that controls the temperature of a computer system in accordance with some embodiments of the present invention.

FIG. 1 represents a system that controls the temperature of a computer system in accordance with some embodiments of the present invention. Computer system 100 includes computer system case 102 with computer system air inlet 104 and computer system exhaust outlet 106. Computer system case 102 is coupled to baffle 108 through computer system air inlet 104, wherein baffle 108 includes baffle ambient air inlet 110 and is coupled to exhaust duct 112 through baffle exhaust air inlet 114. Note that exhaust duct 112 includes valve 116 and exhaust air flows in exhaust duct 112 in the direction represented by the arrow labeled flow of exhaust air 118.

Temperature-control module 120 includes performance-parameter monitor 122 coupled to computer system 100 and coupled to future-temperature-prediction mechanism 124. Future-temperature-prediction mechanism 124 is coupled to valve-control mechanism 126 and valve-control mechanism 126 is coupled to valve 116.

Computer system 100 can include but is not limited to a server, a server blade, a datacenter server, an enterprise computer, a field-replaceable unit that includes a processor, or any other computation system that includes one or more processors, one or more cores in each processor, and one or more fans.

One or more fans in computer system 100 pull air into computer system case 102 through computer system air inlet 104 and force air out of computer system 100 through computer system exhaust outlet 106. Note that exhaust duct 112 channels a portion of exhaust air from computer system exhaust outlet 106 through valve 116 to baffle exhaust air inlet 114. Additionally, baffle 108 is coupled to computer system 100 and mixes ambient air from outside computer system 100 that enters baffle 108 through baffle ambient air inlet 110 with exhaust air that enters baffle 108 through baffle exhaust air inlet 114. The mixed exhaust air and ambient air enters computer system 100 through computer system air inlet 104.

Exhaust duct 112 can be any device that will channel the exhaust air from at least a portion of computer system exhaust outlet 106 to baffle exhaust air inlet 114. In some embodiments, exhaust duct 112 is comprised of two or more exhaust ducts coupled together. In some embodiments exhaust duct 112 includes a flexible plastic pipe. In some embodiments, exhaust duct 112 is built into computer system 100 and/or computer system case 102. In some embodiments, valve 116 is attached to exhaust duct 112 at computer system exhaust outlet 106 or at baffle exhaust air inlet 114, or at a location between computer system exhaust outlet 106 and baffle exhaust air inlet 114. Valve 116 can be any valve that can be controlled by a signal from valve-control mechanism 126 to control the flow of exhaust air into baffle exhaust air inlet 114.

In some embodiments, exhaust air from computer system 100 flows through exhaust duct 112 from at a portion of computer system exhaust outlet 106 to baffle exhaust air inlet 114 due to a pressure difference between computer system exhaust outlet 106 and baffle exhaust air inlet 114. In some embodiments, the pressure difference is due at least in part to one or more fans inside computer system 100. In some embodiments, a pump or fan is included in exhaust duct 112 to help pump air from computer system exhaust outlet 106 to baffle exhaust air inlet 114.

Baffle 108 can be any device that mixes ambient air and exhaust air and passes the mixed air into computer system 100. In the embodiment of FIG. 1, baffle 108 includes fixed swirl vanes 108A and fixed swirl vanes 108B. In some embodiments, fans inside computer system 100 draw mixed air into computer system 100 through computer system air inlet 104 by generating a pressure gradient between computer system air inlet 104 and each of baffle ambient air inlet 110 and baffle exhaust air inlet 114. In some of these embodiments, one or more fans inside computer system 100 provide all of the pressure gradients needed to draw mixed air into computer system 100, ambient air into baffle 108 through ambient air inlet 110, and cause exhaust air to flow through exhaust duct 112 from at least a portion of computer system exhaust outlet 106 to baffle exhaust air inlet 114 and mix with ambient air entering baffle 108 through ambient air inlet 110. In baffle 108, as ambient air and exhaust air flow through fixed swirl vanes 108A, the air mixes in a clockwise swirl. The mixed air is then further mixed as it is drawn through fixed swirl vanes 108B into a counter-clockwise swirl. The mixed air is then drawn through computer air inlet 104 into computer system 100. Note that any internal baffle configuration that mixes ambient air and exhaust air can be used. Moreover, in some embodiments, one or more fans in computer system 100 are kept at a constant speed, while in other embodiments, the speed of one or more fans is maintained in a predetermined range of speeds.

Performance-parameter monitor 122 can be any device that can monitor performance parameters of computer system 100. Performance parameters can include but are not limited to one or more of the following: the speed of one or more fans in computer system 100; the temperature at one or more locations in computer system 100; load and load histories for one or more processors in computer system 100; the frequency of one or more processors in computer system 100; the voltage of one or more processors in computer system 100; throughput variables in computer system 100; transaction latencies in computer system 100; the operating mode of computer system 100, including the power management mode of computer system 100; time series of any performance parameter; and performance parameters for each processor, core, memory module, and power supply in a computer system. Performance parameters can also include but are not limited to performance parameters as set forth in U.S. Pat. No. 7,020,802, entitled "Method and Apparatus for Monitoring and Recording Computer System Performance Parameters," by Kenny C. Gross and Larry G. Votta, Jr., issued on Mar. 28, 2006, which is hereby fully incorporated by reference.

Performance-parameter monitor 122 can be implemented in any combination of hardware and software. In some embodiments, performance-parameter monitor 122 operates on computer system 100. In other embodiments, performance-parameter monitor 122 operates on one or more service processors. In still other embodiments, performance-parameter monitor 122 operates on a separate computer system. In some embodiments, performance-parameter monitor 122 includes a method or apparatus for monitoring and recording computer system performance parameters as set forth in U.S. Pat. No. 7,020,802.

Future-temperature-prediction mechanism 124 can be any device that can receive input from performance-parameter monitor 122 and predict a future temperature of computer system 100 in accordance with embodiments of the present invention. In general, future-temperature-prediction mechanism 124 can implement any method or apparatus now known or later developed to predict the future temperature of computer system 100 without departing from the present invention. In some embodiments, future-temperature-prediction mechanism 124 implements an autoregressive moving average (ARMA) method using monitored performance parameters to predict the temperature of computer system 100 a predetermined time into the future. In some embodiments, the predetermined time is determined based on parameters including but not limited to one or more of: a thermal inertia of computer system 100, and the amplitude of temperature oscillations in computer system 100. In some embodiments, future-temperature-prediction mechanism 124 predicts the temperature of one or more chips in computer system 100, including processors, using ARMA and monitored performance parameters for the chips. Future-temperature-prediction mechanism 124 can be implemented in any combination of hardware and software. In some embodiments, future-temperature-prediction mechanism 124 operates on computer system 100. In other embodiments, future-temperature-prediction mechanism 124 operates on one or more service processors. In yet other embodiments, future-temperature-prediction mechanism 124 operates on a separate computer system. In still other embodiments future-temperature-prediction mechanism 124 operates on the same hardware as performance-parameter monitor 122.

Valve-control mechanism 126 can be any device that can receive input from future-temperature-prediction mechanism 124 and control valve 116 in accordance with embodiments of the present invention. Note that valve-control mechanism 126 can be implemented in any combination of hardware and software. In some embodiments, valve-control mechanism 126 operates on computer system 100. In other embodiments, valve-control mechanism 126 operates on one or more service processors. In still other embodiments, valve-control mechanism 126 operates on a separate computer system. In some embodiments, future temperature-prediction mechanism 124 and valve-control mechanism 126 implement a multiple-input, multiple-output (MIMO) controller. In some embodiments valve-control mechanism 126 operates on the same hardware as performance-parameter monitor 122, and/or future-temperature-prediction mechanism 124.

In some embodiments, one or more of performance-parameter monitor 122, future-temperature-prediction mechanism 124, and valve-control mechanism 126 operate on a computer system in a separate location from computer system 100 and communicate with computer system 100 and/or valve 116 through a network that can include an intranet, one or more wireless links, and/or the Internet.

Some embodiments of the present invention operate as follows. During operation of computer system 100, performance-parameter monitor 122 monitors performance parameters of computer system 100. Future-temperature-prediction mechanism 124 then predicts a temperature of computer system 100 a predetermined amount of time in the future based on monitored performance parameters of computer system 100. Then based on the future temperature predicted by future-temperature-prediction mechanism 124, valve-control mechanism 126 controls valve 116 to control the flow of exhaust air into baffle 108. Note that the temperature of air in baffle 108 is controlled by controlling the amount of exhaust air that enters baffle 108 to mix with ambient air from outside computer system 100. In some embodiments, valve-control mechanism 126 controls valve 116 based on the future temperature predicted for computer system 100 and performance parameters monitored by performance-parameter monitor 122. In some embodiments, valve-control mechanism 126 controls valve 116 to keep the temperature of computer system 100 within a predetermined range of temperatures. In some embodiments, valve control mechanism controls valve 116 to keep the speed of one or more fans in computer system 100 in a predetermined range, that can include keeping the one or more fans at a predetermined speed.

Figure 2:
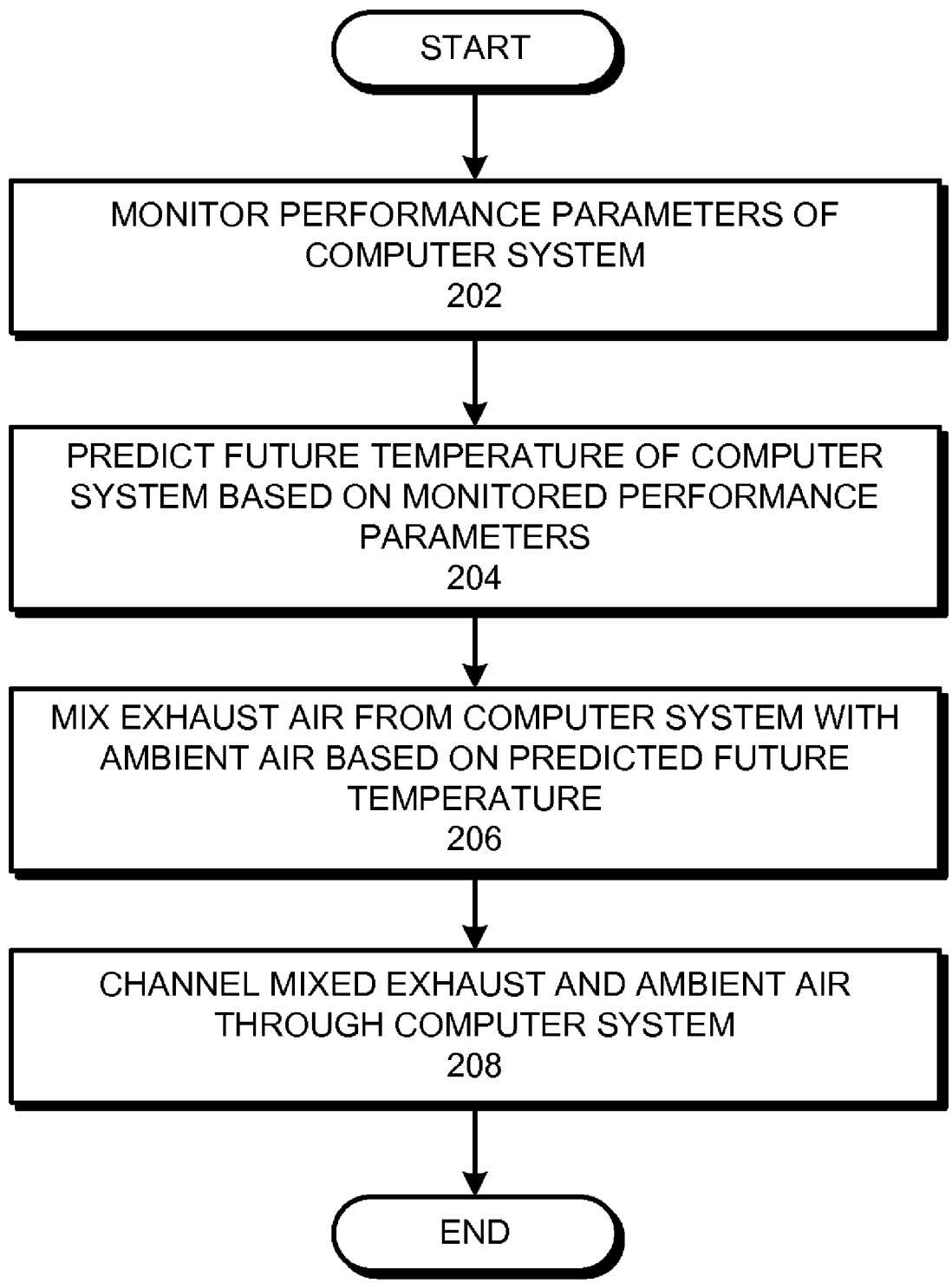
FIG. 2 presents a flowchart illustrating a process for controlling a temperature of a computer system in accordance with some embodiments of the present invention.

FIG. 2 presents a flowchart illustrating a process for controlling a temperature of a computer system in accordance with some embodiments of the present invention. During this process, performance parameters of a computer system are monitored (step 202). Next, the future temperature of the computer system is predicted based on the monitored performance parameters (step 204). Then, exhaust air from the computer system is mixed with ambient air from outside the computer system based on the predicted future temperature (step 206). Then, the mixed exhaust and ambient air is channeled through the computer system to control the temperature of the computer system (step 208).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for controlling a temperature of a computer system, the method comprising:
monitoring a performance parameter of the computer system;
predicting a future temperature of the computer system based on the performance parameter;
in a mixing mechanism, mixing exhaust air from the computer system with ambient air from outside the computer system based on the predicted future temperature, wherein the exhaust air from the computer system is directed through a duct that is coupled between an exhaust outlet of the computer system and an inlet of the mixing mechanism; and
channeling the mixed exhaust air and ambient air through the computer system to control the temperature of the computer system.

2. The method of claim 1,
wherein monitoring the performance parameter includes systematically monitoring and recording a set of performance parameters of the computer system,
wherein the recording process keeps track of the temporal relationships between events in different performance parameters.

3. The method of claim 1, wherein predicting the future temperature of the computer system includes using an autoregressive moving average to predict the future temperature of the computer system.

4. The method of claim 1, wherein predicting the future temperature of the computer system includes predicting the future temperature a predetermined amount of time in the future, wherein the predetermined amount of time is determined based on parameters including a thermal inertia of the computer system.

5. The method of claim 1, wherein mixing exhaust air from the computer system with ambient air from outside the computer system includes generating a control signal to control a mixing valve in the duct that is coupled between an exhaust outlet of the computer system and an inlet of the mixing mechanism.

6. The method of claim 1, wherein mixing exhaust air from the computer system with ambient air from outside the computer system based on the predicted future temperature includes mixing exhaust air from the computer system with ambient air from outside the computer system so that the temperature of the computer system stays within a predetermined range of a target temperature.

7. The method of claim 1, further including:
reducing a variation of speed of a fan in the computer system based on the predicted future temperature of the computer system.

8. The method of claim 1, wherein controlling the temperature of the computer system includes controlling the temperature of a processor in the computer system.

9. The method of claim 1, wherein the performance parameter includes at least one of:
a temperature of the computer system;
a current load of the computer system; and
a moving history window of a load on the computer system.

10. An apparatus that controls a temperature of a computer system, the apparatus comprising:
a monitoring mechanism configured to monitor a performance parameter of the computer system;
a predicting mechanism configured to predict a future temperature of the computer system based on the performance parameter;
a mixing mechanism configured to mix exhaust air from the computer system with ambient air from outside the computer system based on the predicted future temperature;
a duct coupled between an exhaust outlet of the computer system and an inlet of the mixing mechanism that channels the exhaust air from the computer system exhaust outlet to the inlet of the mixing mechanism; and
a channeling mechanism configured to channel the mixed exhaust air and ambient air through the computer system to control the temperature of the computer system.

* * * * *